United States Patent [19]

Duncan et al.

[11] 3,742,141

[45] June 26, 1973

[54] HOTEL/MOTEL ROOM STATUS SYSTEM

[75] Inventors: Robert H. Duncan, Memphis; Thomas P. Miller, Jackson, both of Tenn.

[73] Assignee: Terra Corporation, Jackson, Tenn.

[22] Filed: Oct. 19, 1970

[21] Appl. No.: 81,988

[52] U.S. Cl. .......... 179/2 A, 340/286

[51] Int. Cl. .......... H04m 11/00

[58] Field of Search .......... 179/2, 2 A, 2 DP, 179/42, 90 K, 2 R; 340/311, 312, 313, 286, 153

[56] References Cited

UNITED STATES PATENTS

| | | | |
|---|---|---|---|
| 3,614,325 | 10/1971 | Galian | 179/2 R |
| 3,092,689 | 6/1963 | Sandstrom | 340/312 X |
| 3,228,020 | 1/1966 | Gassenheimer et al. | 340/286 |
| 3,254,335 | 5/1966 | Staten | 340/286 |
| 3,454,724 | 7/1969 | Herter | 179/84 SS |
| 3,588,868 | 6/1971 | Head | 340/313 X |
| 3,515,806 | 6/1970 | Spraker | 179/2 |
| 2,572,104 | 10/1951 | Bowne | 179/42 |
| 3,304,376 | 2/1967 | Truby | 179/42 |

*Primary Examiner*—Donald J. Yusko
*Attorney*—Alter, Weiss & Whitesel

[57] ABSTRACT

An electronic circuit is assigned to each room, in a hotel or motel, and selectively operated from a central control desk to light a lamp assigned to the corresponding room and thereby indicate whether it is vacant or rented. Various interruption rates may be used cause the lamp to flash in different manners, depending upon the current status of the room (i.e. unmade, being cleaned, or ready for occupancy). The electronic circuit may also be connected into computers or advance reservation systems in order to automate billing, room assignment, maintenance, and servicing.

14 Claims, 8 Drawing Figures

INVENTORS
THOMAS P. MILLER
ROBERT H. DUNCAN
BY
Alter, Weiss and Whitesel
ATTORNEYS

PATENTED JUN 26 1973

3,742,141

INVENTORS
THOMAS P. MILLER
ROBERT H. DUNCAN
BY
Alter, Weiss and Whitesel
ATTORNEYS

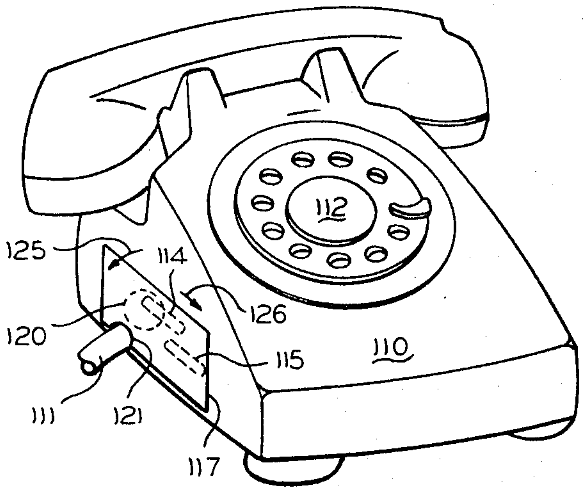
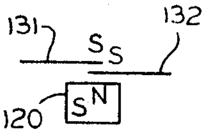
FIG. 4C
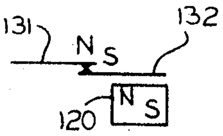
FIG. 4D
FIG. 4A
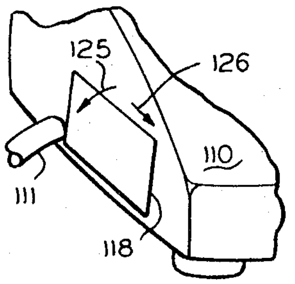
FIG. 4B
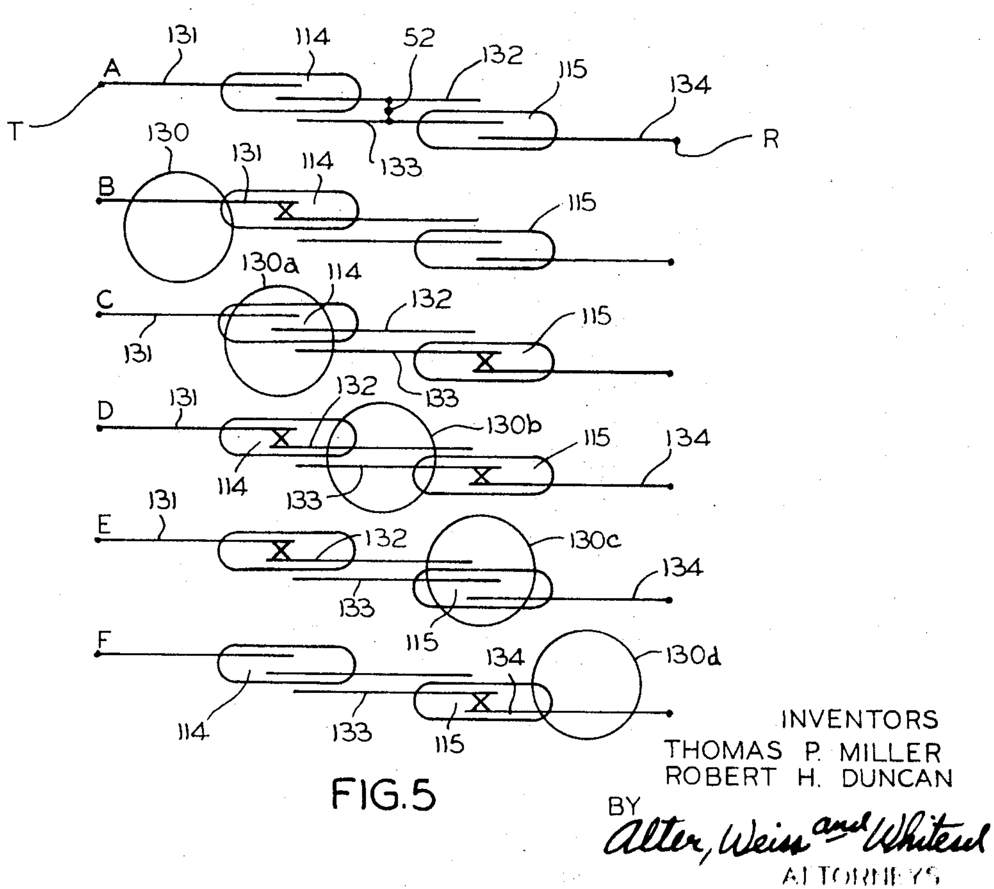
FIG. 5
INVENTORS
THOMAS P. MILLER
ROBERT H. DUNCAN
BY
Alter, Weiss and Whitesel
ATTORNEYS

HOTEL/MOTEL ROOM STATUS SYSTEM

This invention relates to electronic reporting systems and more particularly to systems for reporting the room status in hotels and motels.

Recently, two significant developments have occured in the inn keepers business which create problems that may be solved by electronic control systems. First, hotels and motels have become larger and more luxurious, thereby requiring more services which are rendered on an impersonal basis. Second, large widely scattered motel chains have sprung up, requiring advanced reservation making services at a distant location. As a result of these and other problems, it is harder to exercise truly meaningful managerial controls. Rooms are not made up promptly, guests sometimes leave without proper check out, rooms and telephones are used illegally, and the like. Advance reservations are confirmed when rooms are not available. Still other problems of a similar nature will be readily perceived by those who are familiar with the hotel/motel business.

To solve and overcome these and other problems, electrical systems have been used with switches in the rooms and room identification lights in a manager's office. The switches are operated and the lights are lit so that the manager will know the current room status by a glance at the lights. However, these existing systems require an excessive number of conductors to each room. Almost none of the systems employ existing telephone conductors. Or, if attempts are made to use such telephone conductors, essential telecommunication functions are sacrificed.

Accordingly, an object of the invention is to overcome these and other difficulties and to provide new and improved hotel and motel room status systems. Here, an object is to use flashing lamps and to reduce to a minimum the number of lamps and control devices required for each room.

A further object is to provide for use of the room status system with a readout to an in-house automatic reservation computer type device which enables automated billing and room assignment. Here an object is to enable a further interconnection between the room status system and an advanced reservation system. In addition, an object is to utilize existing telephones, lines, switchboards, or other telephone equipment, without modification, as part of the room status system. In this connection, an object is to provide a system which may be installed on telephone lines extending between a telephone switchboard and the room telephones.

In keeping with an aspect of the invention, these and other objects are accomplished by providing an electronic circuit which may be individually assigned to each room. The circuit includes a plurality of electronic switches that may be selectively set from either the room or a central control desk to light lamps individually assigned to the rooms. Various interruptions rates may be used to cause the lamps to flash at different rates, depending upon current status. The switches may also be connected into computers or advance reservation systems to automate billing, room assignment, maintenance, and servicing.

The nature of a preferred embodiment for accomplishing these and other objects may be understood best from a study of the attached drawings, in which.

FIGS. 4 A, B, C; D show a telephone with a control magnet thereon, and

FIG. 5 schematically shows reed contacts which may be controlled by the magnet.

An exemplary room status system using the inventive concepts is shown in conjunction with existing telephone wires. However, it should be understood that the system may be used equally well in conjunction with completely independent wiring.

Figure 1:
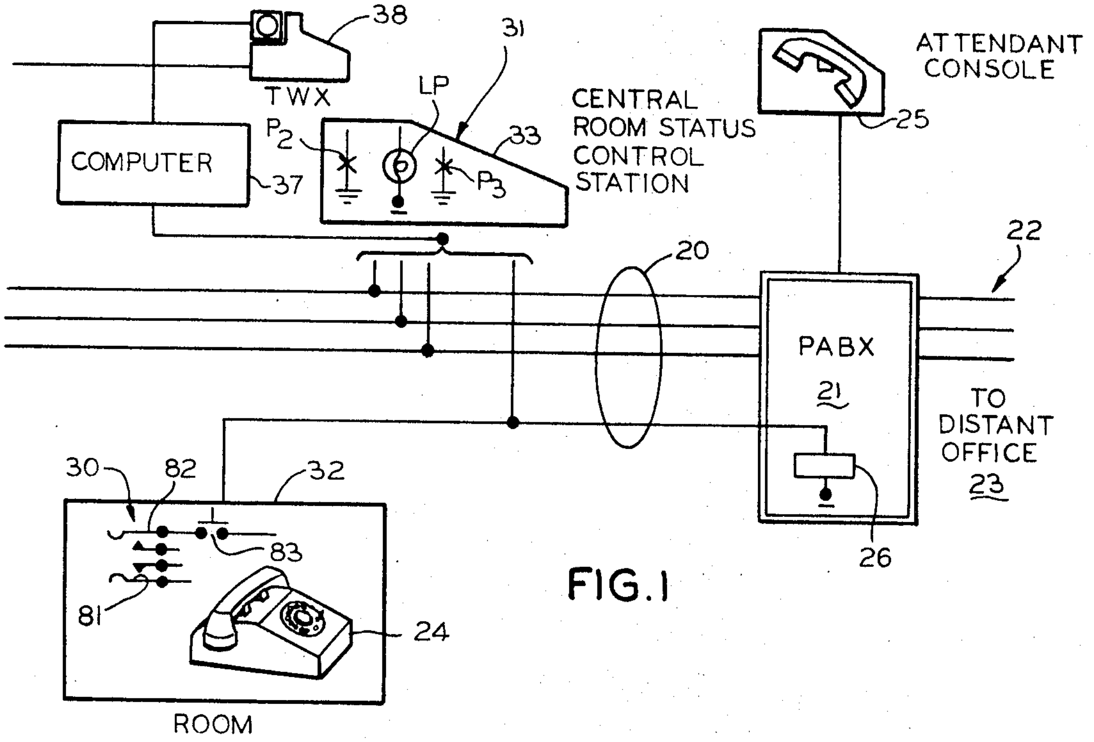
FIG. 1 is a block diagram of the inventive system, as it might be used with a telephone system.

More particularly, FIG. 1 shows a plurality of telephone lines 20, there generally being one line per room. A PABX (private automatic branch exchange) 21 interconnects the local lines 20 with trunks 22 leading to a distant office 23. The PABX may be controlled in a conventional manner from either extension telephones 24 or an attendant's console 25, and sometimes by direct inward dialing from the distant office 23. One or more line circuit relays 26, in the PABX, are dedicated to each line.

The inventive system includes a number of control jacks or keys 30, 31 in the room 32 and at a central room status control station 33. Individual to each room is a display lamp LP which may be lit in either a bright/dim or a steady/flashing condition. The flashing may be at a distinctive rate, to indicate the current status of the room. By glancing at the lamp, the manager becomes aware of the instantaneous status of the room.

In addition, the room status signals may be fed into a automatic reservation computer 37 type of circuit which stores a memory of all instantaneous room conditions. The computer may update billing information according to changes in the room status, as they occur. Moreover, since the automatic reservation computer type of circuit stores a memory of the room status information, it is able to feed reservation availability information into a telegraph system by which distant hotels or motels exchange advance reservation information.

Thus, an operator in a distant motel, of a chain of motels, may call a local teletype machine 38 and request a reservation. The local teletype machine may call in the automatic reservation computer type of circuit 37 which causes it to type out the appropriate reservation information. If the operator in the distant motel receives a message indicating the availability of an appropriate room, she types a message reserving such room, and the teletype machine 38 receives signals which enable the computer 37 to make the reservation.

Neither the manager nor an employee of the local motel need become involved in making the reservation. All that is required is that they occasionally consult either the computer or the message typed by the teletype machine 38. different The nature of the keys or key sets 30, 31 depends to a large degree upon the size of the system. In small systems, push button or toggle switches may be involved. In large systems keyboards may be used. In still larger systems, a plurality of keyboards may be placed inifferent locations. In larger systems it is also possible to provide a switched access with a single set of room keys or push buttons and lamp, together with an address key set or switches. This switching system has the advantage of space and cost reduction, and operational simplification.

Figure 2:
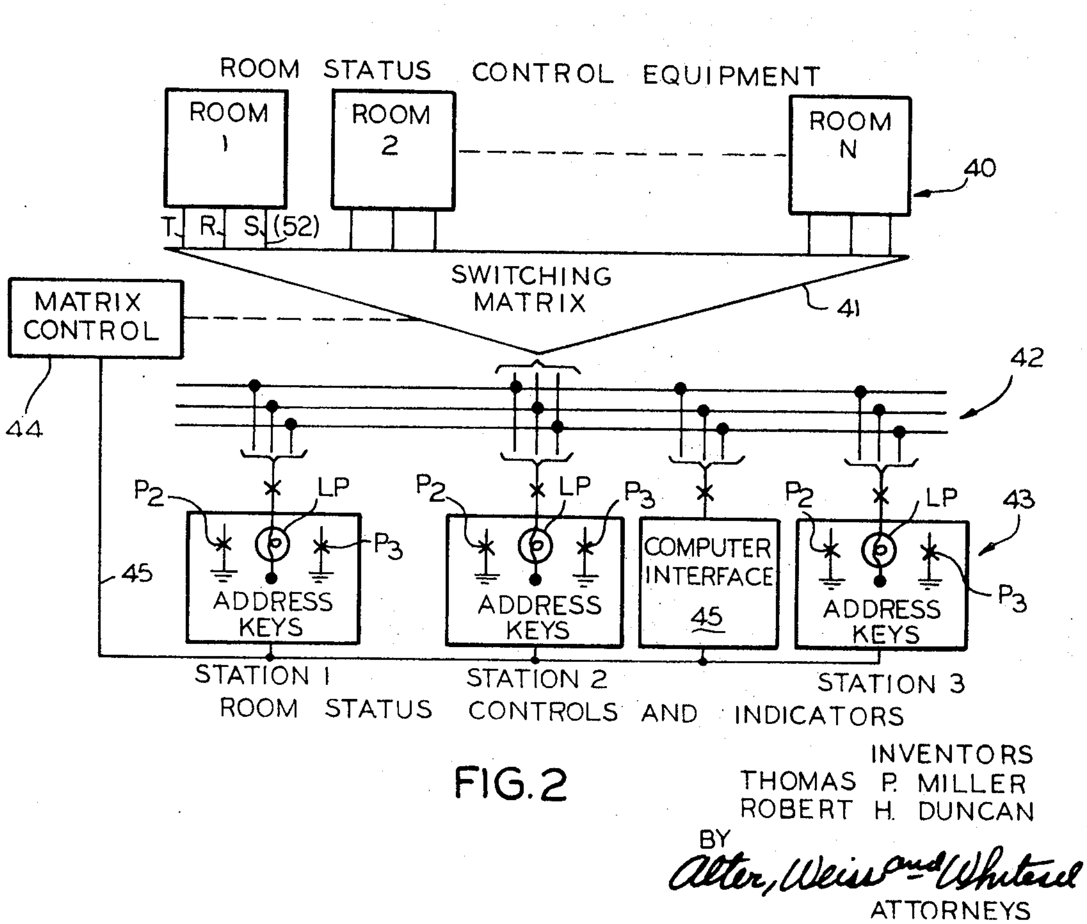
FIG. 2 is a further refinement showng a means for and method of providing an interface between the room status system and a computer.

More particularly, FIG. 2 shows a pluality of rooms 40, a switching matrix 41, system wiring 42, three exemplary room status indicator panels 43, and a matrix control circuit 44. This system may also be connected to an automatic reservation computer type of circuit (either in-house or remote) by the use of an interface circuit 45, which is connected in the position of one of the room status control and indicator circuits 43.

If an operator at any of the positions 43 pushes a button P2 assigned to any room, a signal is sent over a wire 45 to operate the matrix 41 and connect that button P2 via a telephone wire with the associated room. Therefore, the operator observes the lamp and sees a display of the status of that room.

With any change of room status, the matrix 41 is set to establish a path from the room status control equipment for that room to the computer interface circuit 45. The computer is sent the room identity code. Thus, charges against the room are accumulated in the computer when the room is occupied, and the charges are billed out or refused when the room is vacated. Additionally, telephone metering pulses may be used to accumulate telephone charges to the room. With this arrangement, the computer connected to interface 45 knows the status of all rooms at all times. Room assignments are automatically made by room class and equalized according to the frequency of room assignment. This way all rooms receive equal wear.

Figure 3:
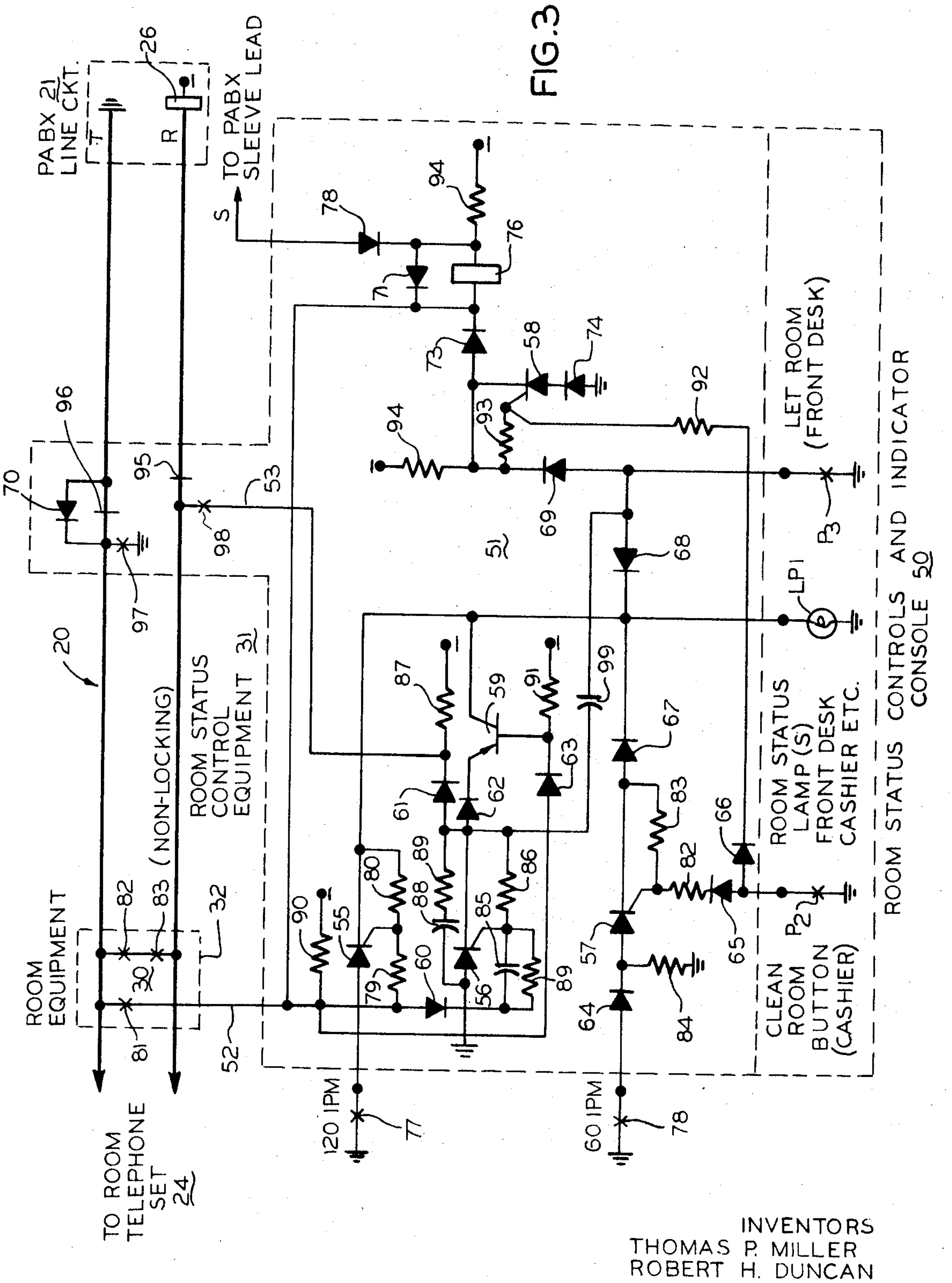
FIG. 3 is a schematic circuit diagram showing the room status system.

The schematic circuit of FIG. 3 shows the circuitry required to fill the blocks of FIG. 1, with dashed lines used to set off the functional circuits corresponding to the blocks. Each room telephone set 24 (FIG. 1) is connected to the PABX 21 by the heavily inked tip and ring conductors (T,R) of a two wire telephone line 20. As here shown, the telephone 24 is on the left and the PABX 21 is on the right of the heavily inked tip and ring conductors T,R.

A line feed potential is applied to the line 20 in a well known manner in the PABX 21. As here shown, the negative or battery side of the line R is connected to the power source via the winding of a line relay 26. The other side T is connected directly to ground. As those skilled in the telephonic arts known, the line relay 26 operates when the telephone is off hook. The relay releases and reoperates when loop dial pulses appear on the line.

The room equipment 32, including contacts 30, is located in the hotel room. These contacts include two locking make contacts 81, 82 which operate together and a push button non-locking contact 83, which is operated alone after contacts 82 close. The electronic equipment 51 is placed at any convenient location, such as the console 33 (FIG. 1) near the registration desk in the hotel room. The room status controls and indicator 50 must be placed near the person who uses and controls the system. In addition, a single wire 52 is connected between the telephone line in the hotel room and the electronic equipment 51. Also the electronic circuit is connected to the telephone line by means of the wire 53. However, this connection 53 is usually made in the vicinity of the PABX so that it does not represent a major wire stringing effort.

The electronic equipment comprises four silicon controlled rectifiers (SCR) 55–58, a PNP transistor 59, 15 diodes 60–74, a relay 76, and various resistors.

The anode of the SCR 55 in each electronic unit 51 is connected to an interrupter 77 operating at 120 impulses per minute (120 IPM). The anode of the SCR 57 in each electronic unit 51 is connected to an interrupter 78 operating at 60 impulses per minute (60IPM). The diode 64 is part of an isolation circuit which prevents all of the other electronic units from shunting the 60 IPM contacts 78. The cathodes of both of the SCRs 55, 56 are connected to a lamp LP1 on the operator's console 50. Thus, the lamp LP1 flashes at 120 IPM when SCR 55 is turned on and at 60 IPM when the SCR 57 is turned on.

Resistors 79, 80 are a voltage divider which is connected from the locking room switch 81 to the gate electrode of SCR 55 to enable the maid to turn on SCR 56 when she enters the room to clean it.

When a room is vacated and requires cleaning, the SCR 57 is switched on by manually controlled contacts P2, which may be located near a cashier. The resistors 82, 83 form a voltage divider for establishing proper gate potentials at the SCR 57. The resistor 84 is current limiting to provide a level of current flow which is too low to have any effect before the SCR 57 is switched on, but is adequate to hold the SCR 57 in a switched condition after it is turned on. The current through resistor 84 is not sufficient to light the lamp LP1. Thus, once the SCR 57 is turned on, the current through resistor 84 holds on until it is turned off. While it is on, the lamp LP1 flashes at 60 IPM. The SCR 57 turns off when it is shunted by the SCR 55, turning on and feeding a shunting signal to the cathode of the diode 67.

The SCR 56 is controlled from the maid-operated room switch contacts 81, which is connected through-the diode 60, cpaacitor 85, resistor 86, diode 61, and resistor 87 to battery. The gate electrode of the switch 56 is connected to this control circuit.

A capacitor 88 and resistor 89 are a series network connected across SCR 56 to prevent rate effect firing. Also, capacitor 88 tends to stabilize the turn-on condition of SCR 56 when the trigger circuit must trigger through a higher impedance, as when lamp LP1 is lit under control of SCR 57 and the 60 IPM interrupter 78.

Diode 60 prevents pulsing of the SCR 56 on the break of contacts 81; otherwise, trouble could occur, with a false triggering of SCR 56. Diode 60 blocks the discharge current of capacitor 85; therefore, a high resistance value 89 provides a leak path for this discharge purpose. Resistor 90 also provides a path for preventing the triggering of SCR 56 when the lamp LP1 is lit under control of SCR 57 and the 60 IPM interrupter 78. The lamp LP1 is controlled from a bus which is at essentially ground potential; hence resistor 90 provides an alternate path to the battery for that condition.

The SCR 56 turns on when contacts 81 close to send a pulse through the capacitor 85 to the gate electrode. Thereafter, the SCR 56 is sustained in its on condition by a maintenance current applied through a diode 61 and resistor 87. The cathode of SCR 56 is connected to drive lamp LP1 via the emitter-collector circuit of transistor 59.

The base of transistor 59 is biased over a circuit extending from ground in the PABX line circuit 21, tip conductor T, contacts 81, wire 52, diode 63, and resistor 91 to battery. The emitter is biaded by the voltage divider formed from ground across SCR 56, diode 61, and resistor 87 to battery. The collector of transistor 59 is connected to ground via the filament of lamp LP1.

Diode 62 suppresses operation of transistor 59 in the reverse direction when the bus of lamp LP1 is instantaneously at ground potential. Without diode 62, transistor 59 functions with the collector acting as an emitter and the emitter acting as collector. This is an unwanted mode which the diode 62 suppresses.

The transistor 59 is biased to turn off when the maid-controlled room contacts 81 are closed to turn on when these contacts are opened if the SCR 56 is conducting. The transistor 59 then turns off when the SCR 56 turns off. The combination of controls and bias circuits are such that the transistor 59 conducts to maintain the lamp LP in a steady lit condition after the room is cleaned and before it is rented.

The SCR 58 is turned on when the cashier or desk clerk operates contacts P2 to apply ground to the end of a voltage divider comprising the series of resistors 92, 93, 94, which are connected to the gate electrode of the SCR 58. Diodes 65 and 66 block interaction between SCR 57 and SCR 58, via their common turn-on path. The SCR 58 is turned off when the contacts P3 are closed to shut the resistors 92, 93 via the diode 69. Diode 74 facilitates a shunt turn-off of SCR 58 via the path P3 and diode 69, thus allowing more current to flow thru the shunt turn-off path for an easier attainment of a current value which is less than the holding current of SCR 58. While the SCR 58 is switched on, current flows through diode 73, the winding of relay 76 and resistor 94 to battery. Sustaining current flows through resistor 94 to hold the SCR 58 in its switched on condition.

The relay 76 operates its break contacts 95 to open the ring side R of the telephone line and to preclude use of the telephone for the purpose of making outgoing calls while the room is vacant. Relay 76 has an additional transfer contact 96, 97 on the tip side T of the telephone line in order to provide a ground path if the PABX uses a balanced line circuit. Note that relay 76 is required to operate from the PABX ground thru its own break contact; hence, the diode 70 is required to shunt the break contact to provide a make before break operation. In fact, a make before break contact may be used at this point. The maid pushes the button 83 if the room is occupied while she is cleaning it. The operation of contacts 81 causes relay 76 to operate from ground over conductor T, contacts 96, 81, wire 52, the winding of relay 76, and resistor 94 to battery. Then, relay 76 closes contacts 98 and prepares a path over wire 53 to turn off SCR 56 responsive to an operation of the push button 83 while the contacts 82 are closed. This turn off circuit may be traced from ground through the contacts 97, 82, 83, 98, and wire 53 to the junction between the diode 61 and resistor 87.

The relay 76 does not interfere with receipt of incoming calls. More particularly, the right hand side of the relay 76 winding is connected to the telephone sleeve lead S. Therefore, if an incoming call is received, a sleeve ground appears in a normal and conventional manner. This ground shunts the relay 76, in a normal manner, and causes it to reclose the break contacts 95, 96. Thus, the maid may be called by a normal telephone call while she is in the room, for example. After the call is completed, the sleeve ground disappears from conductor S. The shunt is removed from relay 76, which operates, and break contacts 95, 96 opens again to prevent a fraudulent use of the telephone from a vacant room.

The inventive hotel/motel room status system of FIG. 3 operates this way. When a guest checks out, a cashier or room clerk presses button P2, causing SCR 57 to switch on responsive to the current flowing into its gate electrode via the divider network 82 and 83. This SCR switching completes a path through diodes 64, 67 to flash the lamp LP1 associated with the room to identified by key P2. The lamp LP1 flashes at 60 IPM under control of the common interrupter 78. Resistor 84 allows a sustaining current to flow to SCR 57 when the interrupter contacts 78 are open, thus enabling the SCR 57 to remain on. The diode 64 prevents all of the many resistors 84, which are connected in parallel, from shunting the 60 IPM contact 78.

It is necessary to have the maid's plug inserted into jack 30 before the lamp LP1 can be extinguished. This insures that the room will be made up before the light goes out.

The maid knows that she must prepare the room for occupancy because it is her daily custom to do so. The maid does not see the lamp flashing at 60 IPM because the lamp is near the desk clerk. When she enters the room to clean it, she operates contacts 30 by inserting a plug into a jack or turning a key operated switch, for example. This operates and closes contacts 81 and 82. Contacts 81 cause the SCR 55 to switch on responsive to the trigger current flowing in its gate electrode via the divider network 79,80.

When the 120 IPM interrupter contacts are closed, the curent flows through SCR 55, shunts SCR 57, and causes it to turn off. The lamp LP1 is now flashing at 120 IPM so that the desk clerk knows where the maid is working. the SCR 55 turns back on when the interrupter contacts 77 open.

When the contacts 81 are closed, the SCR 56 is pulsed, to turn on, via capacitor 85. The SCR 56 is sustained over the path through the diode 61 and resistor 87. The closed contact 81 also causes the transistor 59 to turn off.

In a similar manner, the SCR 58 is also made conductive, responsive to the operation of switch P2, with the resulting operation of relay 76. So that calls may still be made to the room, the lead S is connected to the PABX sleeve lead to shunt down relay 76. Although it is not possible for the maid or anyone else to place telephone calls from a vacant room, she may be called by anyone who sees that lamp LP1 is now flashng at 120 IPM to indicate that a maid is in the room.

When the maid leaves the room, she removes the plug (or key) and contacts 81 and 82 open. When contact 81 is opened, transistor 59 turns on, and SCR 55 turns off responsive to the next opening of the 120 IPM interrupter contacts 77. Thereafter, the lamp LP1 glows continuously under the control of SCR 56 and the conducting transistor 59. This steady lamp indicates that the room is available to let.

When the room is rented, the desk clerk presses button P3 which is individually assigned to that room. This causes the SCR 56 to turn off responsive to a momentary reverse biasing potential applied through the capacitor 99. The SCR 58 turns off when it is shunted from push button P3 acting through diode 69, thus releasing relay 76 and enabling the normal use of the telephone in the room. After the room is rented, the lamp is dark.

When the room is occupied for more than one day, it is still necessary for the maid to clean, as is her custom. At the time she enters the room, she is not aware of any difference since she does not see the lamp LP1 which is near the desk clerk or cashier. Therefore, as the maid enters the room, she follows the same procedure. When the maid sees that the room is still occupied, she presses the button 83 while her plug or key is in the jack 30. This button 83 is enabled by the closure contacts 82 while the plug is in the jack. When SCR 56 is conducting and transistor 59 is turned off by closure of contacts 81, the SCR 56 is sustained over the path including diode 61 and resistor 87. However, the closure of contacts 83 grounds the cathode of diode 61 from the conductor T and contacts 97, thus allowing the current to flow from battery through resistor 87, wire 53, contacts 98, 83, 82 and 97 to ground. The SCR 56 turns off. Thus, removal of the plug from the jack at 30 causes the transitor 59 to again turn on. However, the SCR 56 is now turned off, causing LP1 to turn off and become dark.

If the room has been vacated, the maid does not push button 83 when she enters the room. The maid leaves the room as before, but now there is a steady lamp indication. If the room was vacated without notification to the desk clerk, it can be readily seen if the room lamp is placed adjacent a guest card holder. Thus, a lit lamp adjacent a filled card holder is a signal of a possible fraudulent check out.

If the telephone is inadvertently removed from the hook switch while relay 76 is operated, an alternate sustaining path exists for the SCR 56, the path extending through the emitter-base junction of transistor 59 and resistor 87 to a negative power supply.

As pointed out above, the operation of relay 76 occurs either when switch P2 is operated or when the maid's plug is inserted into jack 30. This relay prevents unauthorized use of the room telephone by the maid (or anyone else) when she is in the room. The isolation of diode 73 and the sustaining current through resistor 94 prevents the SCR 56 from turning off when the switch P2 is operated. This means that the desk clerk and cashier control the denial of telephone service when the room is unoccupied. To prevent the arrangement from enabling the maid to make calls from an occupied room, by removing the plug in jack 30, contacts 81, 82, 83 may be built into a door lock used by the maid only. These contacts must be operated by her in order to gain access to the room. Also, the lock is made so that the key must be left in the lock while the maid is in the room. This way, she cannot fraudulently defeat the system by removing the plug.

The foregoing description has spoken of contacts 81–83 which the maid operates while in the room, as by means of a plug or a key, for example. It should also be noted that these contacts are connected across the telephone line. Therefore, as an alternative, it is possible to place contacts inside the telephone housing and to perform or control the signaling function via switches or keys which are mounted on or in the housing. However, this involves a modification of the housing, per se, and that is not desirable since the telephone company owns most of the telephones. Accordingly, a preferred embodiment of the invention provides for magnetically operating contacts through the telephone housing.

In greater detail, FIG. 4 shows a conventional telephone 110. A telephone cord 111 runs out the left-hand side of the housing, at approximately the center of the telephone base. A suitable dial 112 is mounted on brackets attached to the base plate which supports the telephone.

Inside the telephone, preferably on the dial bracket, two glass reed switches 114, 115 are mounted in an off set manner, as shown in FIGS. 4A and 5A. The tip wire T is connected to the outer leaf 131 of reed switch 114, and the ring wire R is connected to the outer leaf 134 of the reed switch 115. The two inner leaves 132, 133 may be connected together and to the control wire 52, which is also seen in FIG. 3. Thus, the two reed switches 114, 115 are connected in series across the tip and ring conductors T and R, and the electronic circuit 51 is connected to the junction of the series. Normally, these contacts 114, 115 are open so that they have no effect upon the telephone service.

The maid has a small plastic card 117 or 118 made, at least in part, of magnetic material. Thus, the card, 117 has a dashed line circle 120 indicating one option wherein an embedded magnetic disc is provided. The card 118 has no such circle, indicating another option wherein the entire card is made of magnetic material. The magnetic material is polarized transversely so that one magnetic pole is against the telephone housing and the other magnetic pole is facing away from the telephone. As shown in FIG. 4C, like magnetic poles are induced in the leaves 131, 132, of magnetic material on each side of the reed switch when one pole of the magnet 120 is placed across the contact gap 114. Here the assumption is that the north pole N of magnet 120 is placed across gap 114 so that south poles S are induced in the two leaves 131, 132, which repel each other and open the contacts 114. In FIG. 4D, one pole of the magnet 120 is placed over one leaf 132 so that north and south poles N, S, are formed in series across the leaf spring gap to close the contacts 114. The closed contacts are symbolically indicated by a small "*x*" mark at 114 in FIG. 4D. Also, the card 117 has a cutout or notched portion which fits over the telephone line 111. Thus, when the card 117 is fitted with notch 121 over card 111, the magnetic material 120 is always located in a fixed position relative to reed contacts 114, 115, mounted inside the telephone. The card 118 is rectangular and is indexed by being placed against the telephone housing abutting against the cord 111, and resting on the surface supporting the telephone, as seen in FIG. 4B.

When the maid places the card 117 or 118, as shown in FIGS. 4A or 4B, respectively, it is held in place by a magnetic attraction between magnet 120 and metal inside the telephone. When the maid removes the card, she may either pull it off the telephone housing by peeling it away in the direction of the arrow 125. Or, the maid may remove the card by sliding it forward in the direction of the arrow 126.

FIG. 5 shows the effects of placing and removing the card 117 or 118. The magnet 120 may be placed in any one of five positions **130–130*d*. When peeled away in the direction 125, the magnet 120 is in the position 130, but does not pass through the positions 130*a*–130*d*. When the card is slid in the direction 126,** the magnet 120 passes through all five positions 130–130*d*.

When no card is present (FIG. 5A), the contacts 114, 115, are open, and there is no effect on the line. When the card 117 or 118 is indexed over or against the cord 111 (FIG. 5B), the magnetic pole position 130 is over leaf 131 so that the reed contacts 114 are closed to connect conductor T to wire 52. This is the same as closing contacts 81 in FIG. 3.

When the card 117 or 118 is slid forward (FIG. 5C), the magnetic pole position 130*a* reaches the contacts 114. Since the magnet is polarized transversely, both leaves of the reeds 131, 132 have the same magnetic polarity, and they repel each other. Contacts 114 are open. The magnetic pole position 130*a* is over leaf 133 so that the reed contacts 115 are closed. This is the same as opening contacts 81 and closing contacts 82 (FIG. 3).

As the card continues to slide forward in the direction 126, the magnetic pole position 130*b* (FIG. 5D) is over both of the leaves 132, 133 so that both of the contacts 114, 115 are closed, thereby shunting the tip and ring conductors T, R. This is equivalent to closing contacts 82, 83.

As the magnetic pole reaches the position 130*c* (FIG. 5B), the contacts 131, 132 are attracted to each other to close contacts 114. However, the same magnetic polarity is induced in the leaves 133, 134. They repel and open contacts 115.

Finally, the magnetic pole reaches position 130*d* (FIG. 5F), where the two leaves 133, 134 attract each other, and contacts 115 are closed. The magnet is too far away to have any influence upon contacts 114.

Upon reflection, it is obvious that FIG. 5B is equivalent to closure of contacts 81 and FIG. 5D is equivalent to closure of contacts 82, 83. The remaining contact positions shown in FIG. 5 are not functional with respect to the particular circuit of FIG. 3. However, they do give signals representing a logical sequence of events which can be interpreted by a computer for other purposes.

Thus, when she enters the room, the maid places the card in the position shown in either of the FIGS. 4A, 4B. When she leaves she slides the card 117 or 118 in the direction 126 if the room is occupied. This is equivalent to pushing the push button 83 when the room is occupied. If she leaves when the room is vacant, she peels away the card in the direction 125 without passing through the position of FIG. 5D, which is equivalent to not pushing the button 83.

The foregoing describes an exemplary embodiment of the invention. Other modifications will readily occur to those who are skilled in the art. Therefore, the appended claims are to be construed to cover all equivalent structures.

I claim:

1. A hotel/motel room status system comprising electronic circuit means individually assigned to each room monitored by said system, means at a central location for controlling said electronic circuit means to indicate one element of the room status, control means in each of said rooms for indicating another element of the room status, means including at least one wire associated with the monitored room for connectng said monitored room's electronic circuit means to said control means in said room, means at said central location for selectively setting said electronic circuit means to indicate the occupancy/vacancy status of said room, means comprising said one wire extending from said room to said electronic circuit means for selectively modifying said indication according to whether the room is or is not made up, said one wire being one of at least a pair of telephone wires associated with a telephone switchboard and extending between said room and switchboard and said electronic circuit means used for carrying telephone voice signals to a telephone in a room, and call control means associated with said system for precluding the initiation of outgoing calls from said room over said telephone wire while at all times enabling, without interruption, the receipt of incoming calls to said room over said telephone wire.

2. The status system of claim 1 wherein said call control means comprises a relay having contacts for opening and closing said telephone wire, said relay being controlled by said means at the central location, and means responsive to a call to said room for shunting said relay if it is then operated.

3. The status system of claim 1 wherein said one element of room status is the vacancy or rented status of said room and the other element of said room status is the made or unmade status of the room, said status being signaled via said telephone wire.

4. The status system of claim 3 and means for precluding the change of a vacancy status indication prior to the transmission of a signal indicating a clean room from the room control means.

5. The status system of claim 1 and a single lamp individually assigned to each room, said means at a central location comprising means for lighting said lamp in a first distinctive manner when a room is vacated, said means in said room comprising means for lighting said lamp in a second distinctive means for indicating whether said room is or is not occupied and for indicating when the room is or is not cleaned.

6. The status system of claim 5 wherein said means for lighting said lamp in said first distinctive manner comprises means for flashing said lamp at a rate of 60 IPM when the assigned room is vacant, and said means for lighting said lamp in said second distinctive manner comprises means for flashing said lamp at a rate of 120 IPM while the room is being made up, for lighting the lamp in a steady manner after the room is made up if said room is unoccupied, or for leaving said lamp unlit after the room is made up if the room is unoccupied.

7. The status system of claim 1 and means for coupling said telephone wire to an automatic reservation circuit, and means for sending said room status signals over said telephone wire to said automatic reservation circuit means.

8. The status systems of claim 7 wherein there are a plurality of said room control means and of said central location control means, and switching means interposed between said telephone wire and said plurality of central location control means for selectively connecting any room to any central location control means or said automatic reservation circuit means.

9. A method of monitoring the status of hotel/motel rooms through use of an in-house telephone system including a telephone switching means at a central location, room telephones, and telephone lines extending between the rooms and the switching means at the central location, comprisng the steps of:

a. setting an empty room control indicator means when an assigned room is vacated,
b. signaling said indicator means over a telephone line, effectively connected at all times and without interruption between a room telephone and said switching means at the central location in the hotel/motel telephone system, while said assigned room containing said telephone is being cleaned, and
c. changing aid signal over said telephone line after said room has been cleaned.

10. The method of claim 9 and the added step of:

d. sending another signal from a room over said telephone line to indicate whether that room is occupied.

11. The method of claim 9 wherein steps (b) and (c) comprise the added step of placing a magnet over and removing the magnet from the housing of a telephone in order to signal over said telephone line.

12. The method of claim 11 and the added step of moving said magnet over said housing in one way to send one kind of signal over said telephone line and moving said magnet another way to send another kind of signal over said line.

13. The status system of claim 1 wherein the control means in each room comprises at least one reed contact and a magnet positioned over said reed contact.

14. The status system of claim 13 wherein said one wire is a telephone line, there being a plurality of said reed contacts inside the housing of a telephone set connected to said telephone line, said magnet fitting over the housing of said telephone, and means responsive to peeling said magnet away from said housing for operating said contacts in one sequence to send one sequence of signals over said line and responsive to a removal of said magnet from said housing in a sliding motion for operating said contacts in another sequence to send signals in a different sequence over said line.

* * * * *